United States Patent
Hua et al.

(10) Patent No.: US 11,663,832 B2
(45) Date of Patent: May 30, 2023

(54) METHOD AND SYSTEM FOR DETECTING AND ANALYZING OBJECTS

(71) Applicants: MICROMAX INTERNATIONAL CORP., Taipei (TW); NATIONAL TAIWAN UNIVERSITY OF SCIENCE AND TECHNOLOGY, Taipei (TW)

(72) Inventors: Kai-Lung Hua, Taipei (TW); Yung-Yao Chen, Taipei (TW); Sin-Ye Jhong, Taipei (TW); Yo-Cheng Chen, Taipei (TW); Ba-Lin Lin, Taipei (TW); Tzyy-Yzong Lin, Taipei (TW); Cheng-Shu Wen, Taipei (TW); Yen-Po Wang, Taipei (TW); Chun-Jung Chen, Taipei (TW); Tung-Hsin Yang, Taipei (TW); Wen-Hsiang Lu, Taipei (TW); Chyi-Jia Huang, Taipei (TW)

(73) Assignees: Micromax International Corp., Taipei (TW); National Taiwan Universiy of Science and Technology, Taipei (TW)

( * ) Notice: Subject to any disclaimer, the term of this patent is extended or adjusted under 35 U.S.C. 154(b) by 54 days.

(21) Appl. No.: 17/551,621

(22) Filed: Dec. 15, 2021

(65) Prior Publication Data
US 2022/0230443 A1    Jul. 21, 2022

Related U.S. Application Data

(60) Provisional application No. 63/138,968, filed on Jan. 19, 2021.

(30) Foreign Application Priority Data
Apr. 22, 2021 (TW) .................. 110114549

(51) Int. Cl.
G06V 20/58 (2022.01)
G06T 5/00 (2006.01)
(Continued)

(52) U.S. Cl.
CPC .......... *G06V 20/58* (2022.01); *G01S 13/9027* (2019.05); *G01S 13/9029* (2013.01);
(Continued)

(58) Field of Classification Search
CPC .... G06V 20/58; G06V 10/757; G06V 10/761; G06V 10/803; G06V 10/80;
(Continued)

(56) References Cited

FOREIGN PATENT DOCUMENTS

| CN | 109655825 A | * 4/2019 | ............ G01S 13/86 |
|---|---|---|---|
| CN | 111812649 A | * 10/2020 | |

OTHER PUBLICATIONS

Liu et al, A Novel Multi-Sensor Fusion Based Object Detection and Recognition Algorithm for Intelligent Assisted Driving, May 25, 2021, IEEE Access 9: 81564-81574. (Year: 2021).*

(Continued)

*Primary Examiner* — John Villecco
*Assistant Examiner* — Kathleen M Broughton
(74) *Attorney, Agent, or Firm* — Rosenberg, Klein & Lee

(57) ABSTRACT

A method for detecting objects and labeling the objects with distances in an image includes steps of: obtaining a thermal image from a thermal camera, an RGB image from an RGB camera, and radar information from an mmWave radar; adjusting the thermal image based on the RGB image to generate an adjusted thermal image, and generating a fused image based on the RGB image and the adjusted thermal image; generating a second fused image based on the fused image and the radar information; detecting objects in the images, and generating, based on the fused image, another
(Continued)

fused image including bounding boxes marking the objects; and determining motion parameters of the objects.

16 Claims, 10 Drawing Sheets

(51) Int. Cl.
 *G06V 10/80* (2022.01)
 *G06V 10/75* (2022.01)
 *G06V 10/74* (2022.01)
 *G01S 13/90* (2006.01)
 *H04N 23/55* (2023.01)

(52) U.S. Cl.
 CPC ............ *G06T 5/003* (2013.01); *G06V 10/757* (2022.01); *G06V 10/761* (2022.01); *G06V 10/803* (2022.01); *H04N 23/55* (2023.01); *G06T 2207/10024* (2013.01); *G06T 2207/10044* (2013.01); *G06T 2207/30252* (2013.01); *G06T 2210/12* (2013.01); *G06V 2201/07* (2022.01)

(58) Field of Classification Search
 CPC ............ G06V 2201/07; G01S 13/9027; G01S 13/9029; G01S 13/867; G01S 13/931; G01S 7/2955; G06T 5/003; G06T 2207/10024; G06T 2207/10044; G06T 2207/30252; G06T 2207/10048; G06T 2207/30261; G06T 2207/10028; G06T 2207/20221; G06T 2207/10016; G06T 2210/12; G06T 7/33; G06T 7/246; H04N 23/55

See application file for complete search history.

(56) References Cited

OTHER PUBLICATIONS

Lepure et al, A Novel Tracking Algorithm Using Thermal and Optical Cameras Fused with mmWave Radar Sensor Data, Nov. 4, 2021, IEEE Transactions on Consumer Electronics; 67(4):372-382. (Year: 2021).*

Bijelic et al, Seeing Through Fog Without Seeing Fog: Deep Multimodal Sesnor Fusion in Unseen Adverse Weather, IEEE Conference on Computer Vision and Pattern Recognition, Feb. 10, 2020; (Year: 2020).*

* cited by examiner

METHOD AND SYSTEM FOR DETECTING AND ANALYZING OBJECTS

CROSS-REFERENCE TO RELATED APPLICATION

This application claims priority of U.S. provisional Application No. 63/138,968, filed on Jan. 19, 2021, and Taiwanese Invention Patent Application No. 110114549, filed on Apr. 22, 2021.

FIELD

The disclosure relates to object detection, and more particularly to a method and a system for detecting and analyzing objects.

BACKGROUND

Some conventional methods for object detection and recognition utilize only an RGB camera or a thermal camera to take a picture of a scene, and recognize objects in the scene based on the picture thus taken. However, the RGB camera can only take clear pictures in a bright environment. When there is insufficient light in the environment, for example, at night, or when objects are obscured because of bad weather, such as rain, snow or fog, or are in a space filled with smoke or ashes, quality of pictures taken by the RGB camera may be too poor for objects to be recognized. On the other hand, although the quality of pictures taken by the thermal camera is less affected by ambient light intensity, the pictures taken by the thermal camera can only reveal a rough outline of an object without any visual details, and, when temperatures of two objects that are adjacent to each other are roughly the same, the two objects may appear to be merged into a single object in pictures taken by the thermal camera. Therefore, the thermal camera may be utilized to detect objects present in a scene, but cannot provide any detailed information, e.g., as to what objects are present or how many objects there are. Millimeter wave (mmWave) radar has been used in computer vision. Although the mmWave radar is able to detect objects in all kinds of weather and is irrelevant to ambient light, it is of little help in recognizing objects due to its low resolution.

SUMMARY

Therefore, an object of the disclosure is to provide a method and a system for detecting and analyzing objects that can alleviate at least one of the drawbacks of the prior art. The system and the method may precisely detect and analyzing each object in a scene, and determine at least one characteristic related to the object that includes a distance to the object.

According to one aspect of the disclosure, the method for detecting and analyzing objects is to be performed by a system including a thermal camera, an RGB camera, a millimeter wave (mmWave) radar and an image processing device. The image processing device includes an image fusion module, a coordinate transformation module, an object detection module and an image integration module. The method includes a step A): controlling the thermal camera, the RGB camera and the mmWave radar to operate synchronously, so that the thermal camera captures a thermal image of a scene at a time point and sends the thermal image to the image processing device, the RGB camera captures an RGB image of the scene at the same time point and sends the RGB image to the image processing device, and the mmWave radar generates radar information with respect to the scene at the same time point by scanning the scene and sends the radar information to the image processing device, wherein the radar information includes coordinates of a plurality of radar points related to multiple objects in the scene that have been detected by the mmWave radar. The method further includes a step B): by the image fusion module of the image processing device, adjusting the thermal image based on the RGB image in order to generate an adjusted thermal image, and generating a first fused image by combining the RGB image and the adjusted thermal image. The method further includes a step C): by the coordinate transformation module of the image processing device, generating a coordinate chart that includes a plurality of data points based on the coordinates of the radar points, and generating a second fused image based on the first fused image by projecting the data points of the coordinate chart onto the first fused image according to a radar-to-camera projection matrix, wherein each of the data points corresponds to at least one of the radar points, and the second fused image includes graphical points corresponding respectively to the data points. The method further includes a step D): by the object detection module of the image processing device, detecting objects in the scene that are present in the RGB image and the adjusted thermal image by analyzing the RGB image and the adjusted thermal image, locating the objects thus detected in the first fused image, and generating a third fused image based on the first fused image by drawing, for each of the objects in the first fused image, a bounding box around the object to mark the object. The method further includes a step E): by the image integration module of the image processing device and for each of the objects in the scene that is marked in the third fused image, determining a set of motion parameters of the object that includes a distance from the mmWave radar to the object. The distance is determined by: comparing the second fused image and the third fused image to find at least one graphical point among the graphical points in the second fused image that is within a region defined by the bounding box that marks the object; determining which one of the radar points that correspond to at least one data point corresponding to the at least one graphical point thus found is a nearest radar point to the mmWave radar based on coordinates of the radar points; and calculating the distance from the mmWave radar to the object based on the coordinates of the nearest radar point.

According to one aspect of the disclosure, the system for detecting and analyzing objects includes an image processing device, a thermal camera, an RGB camera and a millimeter wave (mmWave) radar. The image processing device includes an image fusion module, a coordinate transformation module, an object detection module and an image integration module. The thermal camera is in communication with the image processing device and is configured to capture thermal images and send the thermal images to the image processing device. The RGB camera is in communication with the image processing device, and is configured to capture RGB images and send the RGB images to the image processing device. The mmWave radar is in communication with the image processing device, and is configured to scan a space in order to detect object(s) in the space, generate radar information related to the space, and send the radar information to the image processing device. The image processing device is configured to control the thermal camera, the RGB camera and the mmWave radar to operate synchronously, so that the thermal camera captures a thermal image of a scene at a time point and sends the thermal image to the image processing device, the RGB camera captures an RGB image of the scene at the same time point and sends the RGB image to the image processing device, and the mmWave radar generates radar information with respect to the scene at the same time point by scanning the scene and sends the radar information to the image processing device. The radar information includes coordinates of a plurality of radar points related to multiple objects in the scene that have been detected by the mmWave radar. The image fusion module of the image processing device is configured to adjust the thermal image based on the RGB image in order to generate an adjusted thermal image, and generate a first fused image by combining the RGB image and the adjusted thermal image. The coordinate transformation module of the image processing device is configured to generate a coordinate chart that includes a plurality of data points based on the coordinates of the radar points, and generate a second fused image based on the first fused image by projecting the data points of the coordinate chart onto the first fused image according to a radar-to-camera projection matrix, wherein each of the data points corresponds to at least one of the radar points, and the second fused image includes graphical points corresponding respectively to the data points. The object detection module of the image processing device is configured to detect objects in the scene that are present in the RGB image and the adjusted thermal image by analyzing the RGB image and the adjusted thermal image, locate the objects thus detected in the first fused image, and generate a third fused image based on the first fused image by drawing, for each of the objects in the first fused image, a bounding box around the object to mark the object. The image integration module of the image processing device is configured to, for each of the objects in the scene that is marked in the third fused image, determine a set of motion parameters that includes a distance from the mmWave radar to the object. The distance is determined by comparing the second fused image and the third fused image to find at least one graphical point among the graphical points in the second fused image that is within a region defined by the bounding box that marks the object, by determining which one of the radar points that correspond to at least one data point corresponding to the at least one graphical point thus found is a nearest radar point to the mmWave radar based on coordinates of the radar points, and by calculating the distance from the mmWave radar to the object based on the coordinates of the nearest radar point.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
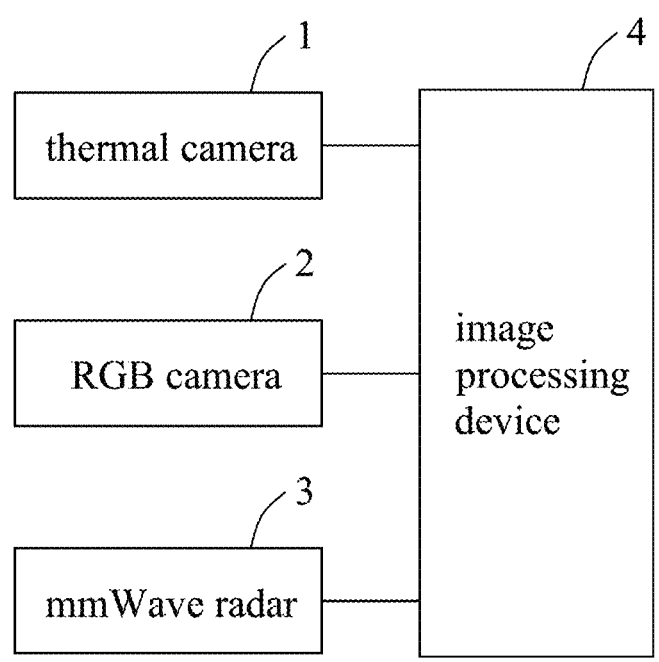
FIG. 1 is a block diagram that exemplarily illustrates a system for detecting and analyzing objects according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 exemplarily illustrates a system for detecting and analyzing objects according to an embodiment of the disclosure. As shown in FIG. 1, the system includes a thermal camera 1, an RGB camera 2, a millimeter wave (mmWave) radar 3, and an image processing device 4 that is in communication with the thermal camera 1, the RGB camera 2 and the mmWave radar 3. The thermal camera 1 is configured to capture thermal images and send the thermal images to the image processing device 4. The RGB camera 2 is configured to capture RGB images and send the RGB images to the image processing device 4. The mmWave radar 3 is configured to scan a space in order to detect object (s) in the space, generate radar information related to the space, and send the radar information to the image processing device 4. The mmWave radar 3 is usable to determine the distance, velocity and/or angle of an object with respect to the mmWave radar 3, where mmWave signals transmitted by the mmWave radar 3 are able to penetrate certain materials, such as plastic, drywall and clothing.

Figure 2:
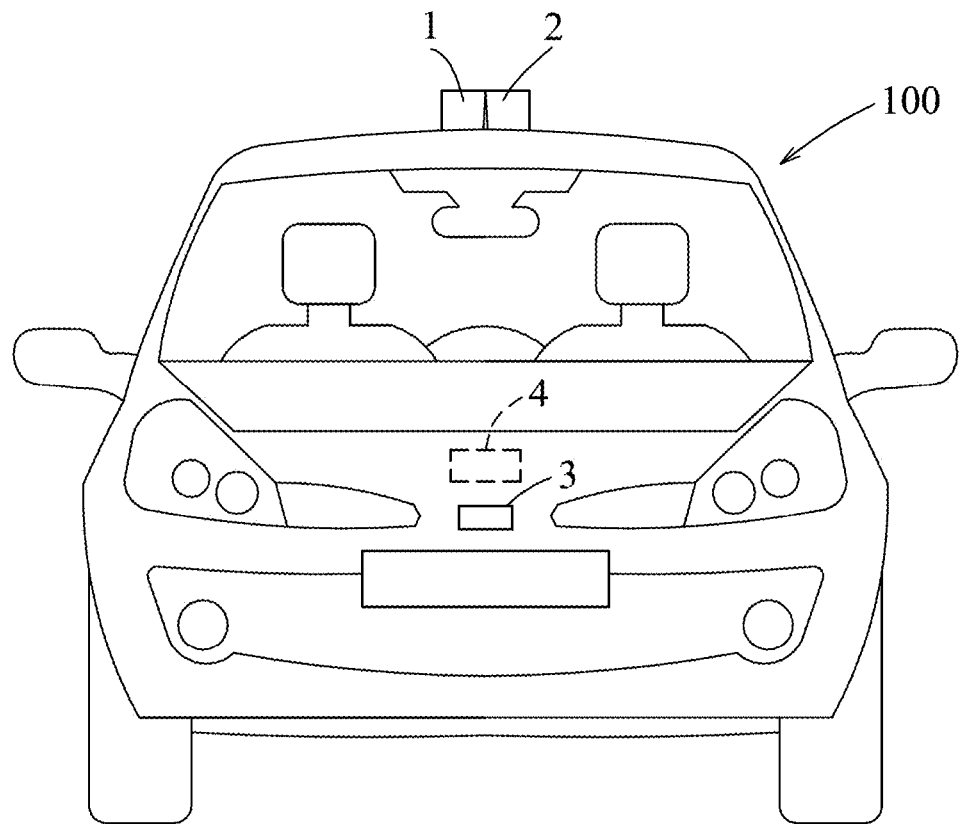
FIG. 2 is a schematic diagram that exemplarily illustrates the system being installed on a carrier device according to an embodiment of the disclosure.

The system may be installed on a carrier device, e.g., a vehicle, to detect and analyze objects in a moving direction of the carrier device. FIG. 2 exemplarily illustrates the system that is installed on a car 100 according to an embodiment of the disclosure. In the embodiment shown in FIG. 2, the thermal camera 1 and the RGB camera 2 are fixed on the car roof next to each other, the mmWave radar 3 is fixed to the front of the car 100 at a height that is approximately equal to the height of the headlights of the car, and the image processing device 4 is installed in the car 100. The thermal camera 1, the RGB camera 2 and the mmWave radar 3 all face the forward direction of the car 100. It is noted that positions of the thermal camera 1, the RGB camera 2, the mmWave radar 3 and the image processing device 4 in/on the car as shown in FIG. 2 are only an example, and do not limit the disclosure. For example, the mmWave radar 3 may be fixed in a region proximate to the headlights. Further, the system is not limited to being installed on a car, and can be installed on other carrier devices such as a bus, a train, an autonomous mobile robot (AMR), an unmanned aerial vehicle (UAV), etc.

The image processing device 4 is electrically connected to the thermal camera 1, the RGB camera 2 and the mmWave radar 3, in order to control the thermal camera 1, the RGB camera 2 and the mmWave radar 3 to operate synchronously, so that the thermal camera 1 captures a thermal image of a scene at a time point and sends the thermal image to the image processing device 4, the RGB camera 2 captures an RGB image of the scene at said time point and sends the RGB image to the image processing device 4, and the mmWave radar 3 generates radar information with respect to the scene at said time point by scanning the scene and sends the radar information to the image processing device 4. According to some embodiments, the image processing device 4 may be, but not limited to, a microcomputer. In an embodiment where the system is installed on a car, the image processing device 4 is an automotive computer (i.e., an in-vehicle computer).

Figure 3:
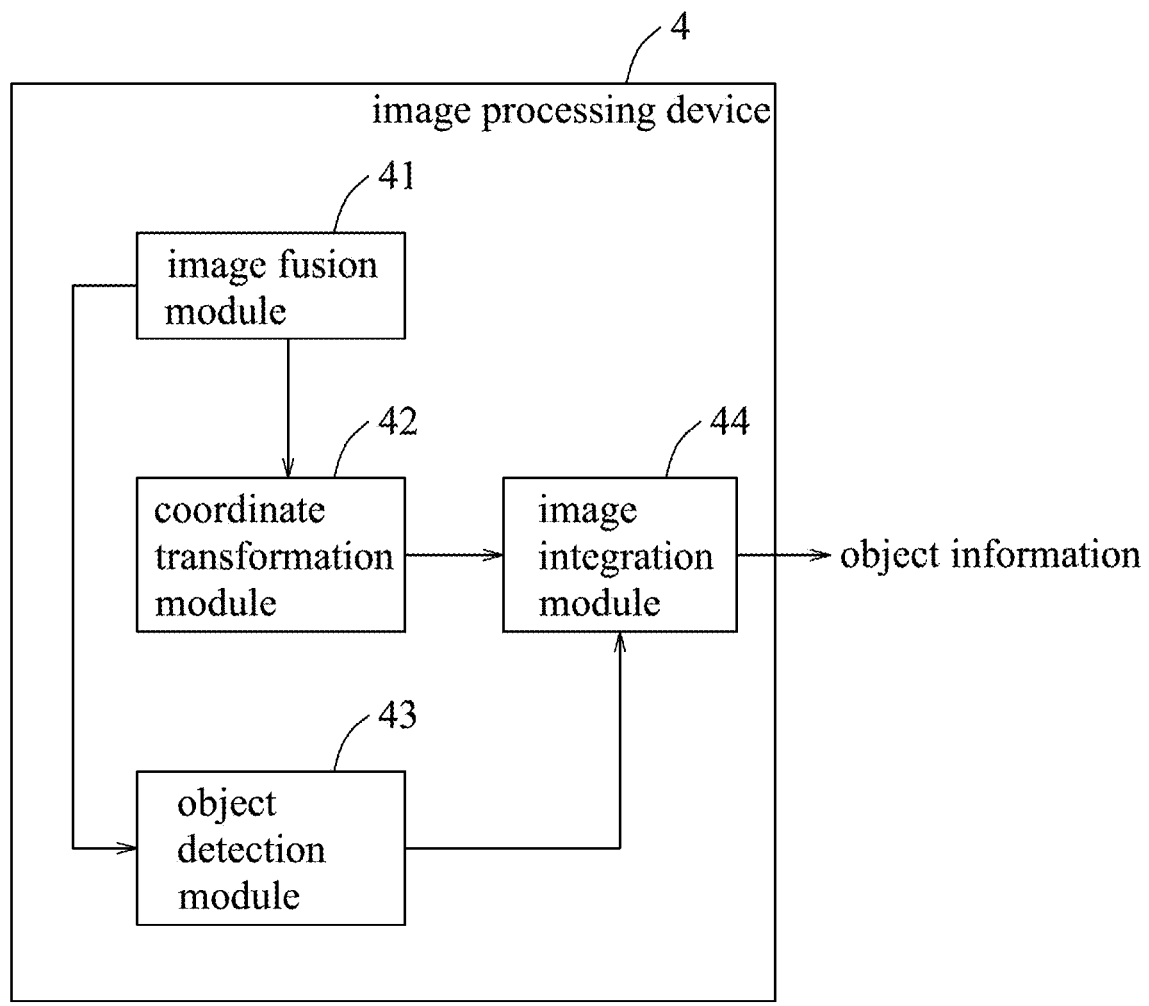
FIG. 3 is a block diagram that exemplarily illustrates an image processing device according to an embodiment of the disclosure.

Referring to FIG. 3, the image processing device 4 includes an image fusion module 41, a coordinate transformation module 42, an object detection module 43 and an image integration module 44. The arrows in FIG. 3 indicate data flows among these modules, details of which will be provided later. According to some embodiments, the image fusion module 41, the coordinate transformation module 42, the object detection module 43 and the image integration module 44 may be, but not limited to, software modules that are executable by a processor (not shown in the drawings) of the image processing device 4, wherein said processor may be, for example, a central processing unit (CPU) or a graphics processing unit (GPU). The image fusion module 41, the coordinate transformation module 42, the object detection module 43 and the image integration module 44 may also each be a combination of firmware and hardware or a combination of software and hardware.

Figure 4:
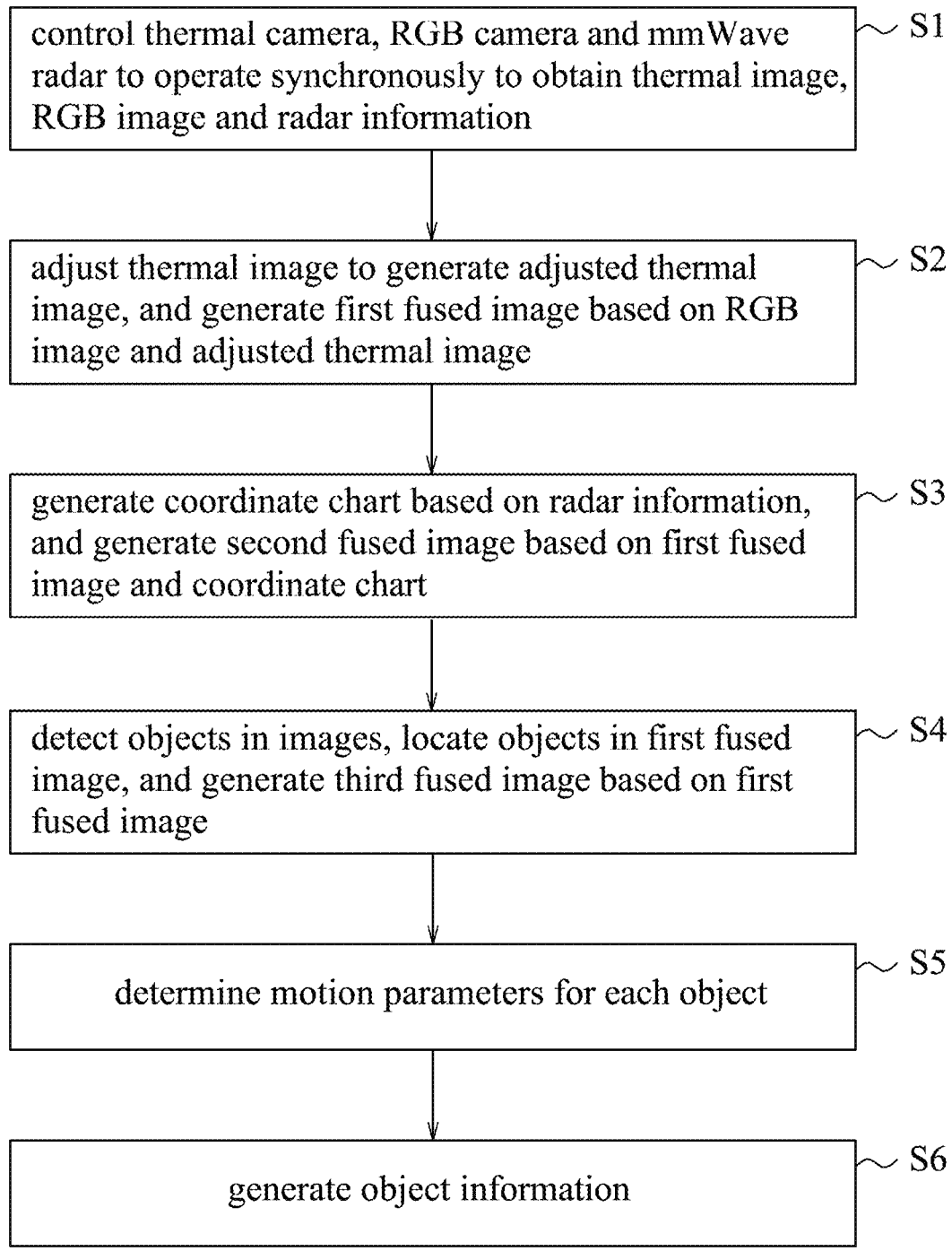
FIG. 4 is a flow chart that exemplarily illustrates a method for detecting and analyzing objects according to an embodiment of the disclosure.

A method for detecting and analyzing objects that may be implemented by the system is exemplarity illustrated in FIG. 4 according to an embodiment of the disclosure. The method includes steps S1, S2, S3, S4, S5 and S6. The image fusion module 41, the coordinate transformation module 42, the object detection module 43 and the image integration module 44 are configured in such a way that this method may be performed by the system of FIG. 1 when the system is activated. In an embodiment where the system is installed on a car, the system may be automatically activated when the car is started or may be activated manually according to user's operation.

In Step S1, the image processing device 4 controls the thermal camera 1, the RGB camera 2 and the mmWave radar 3 to operate synchronously, so that the thermal camera 1 captures a thermal image of a scene at a time point and sends the thermal image to the image processing device 4, the RGB camera 2 captures an RGB image of the scene at the same time point and sends the RGB image to the image processing device 4, and the mmWave radar 3 generates radar information with respect to the scene at the same time point by scanning the scene and sends the radar information to the image processing device 4. The radar information generated and sent by the mmWave radar 3 includes coordinates of a plurality of radar points related to multiple objects in the scene that have been detected by the mmWave radar 3. The coordinates of each of the radar points are indicative of a spatial point in the scene where mmWave signals transmitted by the mmWave radar 3 are reflected, and also indicative of a distance between the spatial point and the mmWave radar 3. According to some embodiments, the radar information may be graphical information showing the coordinates and the distances. In an embodiment where the system is installed on the car 100 as shown in FIG. 2, the scene is a scene in front of the car 100.

In Step S2, the image fusion module 41 of the image processing device 4 adjusts the thermal image based on the RGB image in order to generate an adjusted thermal image that has multiple image features, wherein the image features of the adjusted thermal image would correspond to and be aligned with multiple image features of the RGB image if the adjusted thermal image is superimposed on the RGB image. Then, the image fusion module 41 generates a first fused image by combining the RGB image and the adjusted thermal image. The image fusion module 41 further sends the first fused image to the transformation module 42 (this data flow is indicated in FIG. 3 by the arrow between the image fusion module 41 and the transformation module 42), and sends the first fused image, the adjusted thermal image and the RGB image to the object detection module 43 of the image processing device 4 (this data flow is indicated in FIG. 3 by the arrow between the image fusion module 41 and the object detection module 43). According to some embodiments, the first fused image may not be generated from the whole RGB image and/or the whole adjusted thermal image. That is, the first fused image may be generated by combining only a portion of the RGB image with the adjusted thermal image, or combining only a portion of the RGB image with only a portion of the adjusted thermal image.

Figure 5:
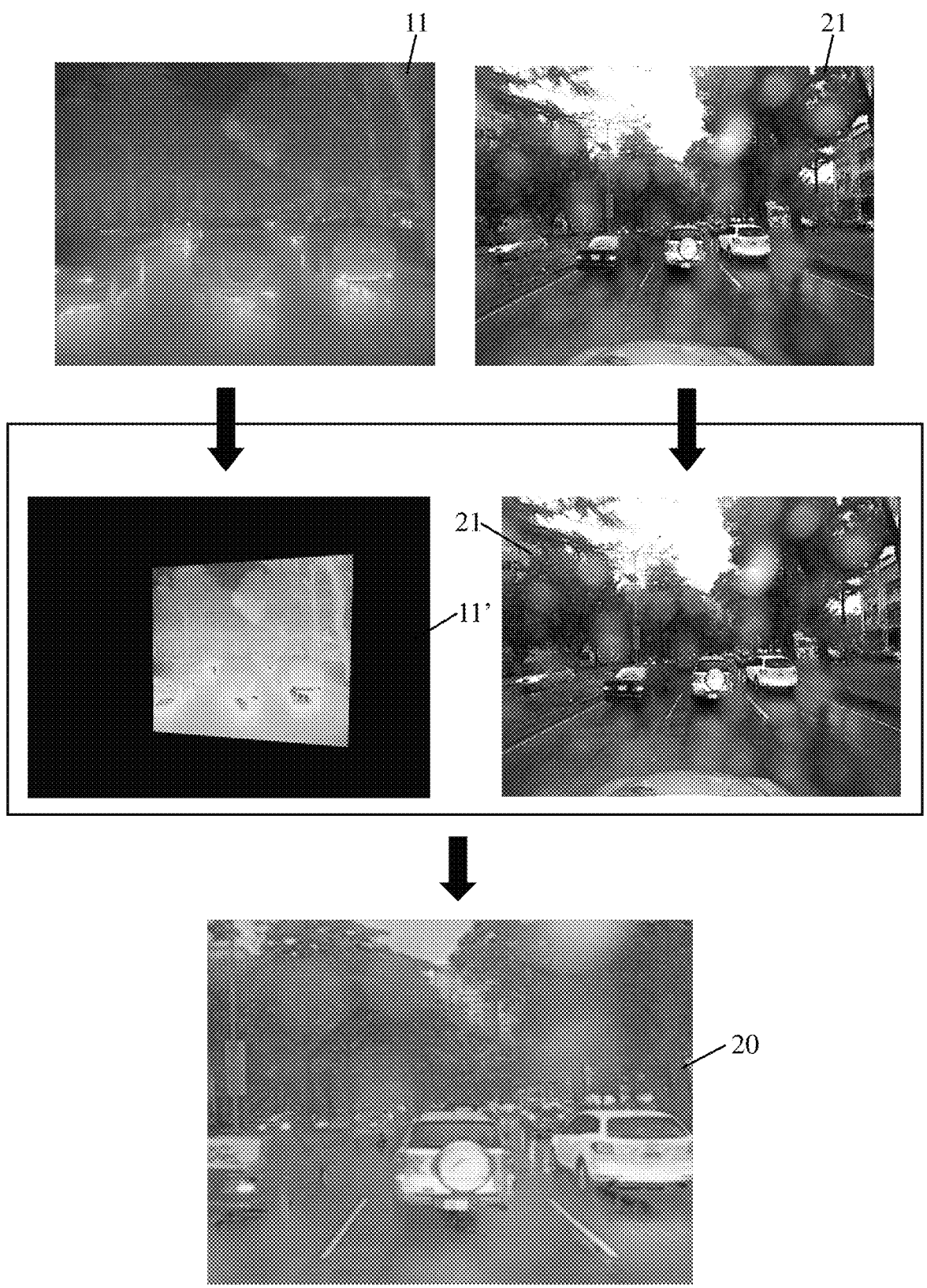
FIG. 5 exemplarily illustrates a first fused image that is generated from a thermal image and an RGB image according to an embodiment of the disclosure.

A first fused image 20 that is generated from a thermal image 11 captured by the thermal camera 1 and an RGB image 21 captured by the RGB camera 2 is exemplarily illustrated in FIG. 5 according to an embodiment of the disclosure. Specifically, the first fused image 20 is generated by combining (indicated by the rectangular frame in the middle portion of FIG. 4) the RGB image 21 and an adjusted thermal image 11' which is generated from the thermal image 11, wherein the adjusted thermal image 11' has plural image features that correspond to plural cars in front of the thermal camera 1 and the RGB camera 2, and that are aligned with plural image features in the RGB image 21 which also correspond to the plural cars if the adjusted thermal image 11' is superimposed on the RGB image 21. The adjusted thermal image 11' also has a filler frame (of the color black) which corresponds to a region in the RGB image 21 that shows things beyond the field of view (as shown in the thermal image 11) of the thermal camera 1. As seen, the first fused image 20 shown in FIG. 4 is not generated from the whole RGB image 21 and the whole adjusted thermal image 11', but only from a portion of the RGB image 21 and a portion of the adjusted thermal image 11' that each correspond to the field of view of the thermal camera 1 (i.e., correspond to the content of the thermal image 11).

The adjusted thermal image and the first fused image may be generated by utilizing any suitable technique known in the pertinent art. In a non-limiting embodiment of this disclosure, the adjusted thermal image and the first fused image are generated by utilizing a fusing method. In the fusing method, the thermal image is divided into several thermal image portions, and these thermal image portions are adjusted respectively by using several homography matrices which are derived with respect to both of the thermal camera land the RGB camera 2, so that each of the thermal image portions thus adjusted has plural image features that would correspond to and be aligned with plural image features of the RGB image, respectively, if the thermal image portion thus adjusted is superimposed on a corresponding portion of the RGB image. Subsequently, in the fusing method, the thermal image portions thus adjusted are combined to form the adjusted thermal image. To obtain the fused image, the adjusted thermal image may first be converted into a colored image, and then combined with the RGB image.

According to some embodiments, Step S2 may further include adjusting the RGB image. In this case, the adjusted thermal image may be generated by adjusting the thermal image based on the RGB image that has been adjusted, and the first fused image may be generated by combining the adjusted thermal image and the RGB image that has been adjusted. Specifically, in embodiments where the RGB camera 2 does not use a wide-angle lens (e.g., the RGB camera 2 uses a general purpose lens or a standard lens), the image fusion module 41 may adjust the RGB image by utilizing a matrix of intrinsic parameters for the RGB camera 2 in order to eliminate image distortion caused by an internal mechanism, an image sensor or the lens of the RGB camera 2. The matrix of intrinsic parameters may be predetermined with respect to the RGB camera 2 and may be easily acquired by the image processing device 4 (e.g., from a manufacturer of the RGB camera 2). On the other hand, in embodiments where the RGB camera 2 uses a wide-angle lens (e.g., a fisheye lens), the image fusion module 41 may adjust the RGB image by utilizing a calibration matrix for the RGB camera 2 that reduces distortion effect in the RGB image. Similarly, the calibration matrix may be predetermined with respect to the RGB camera 2 and may be easily acquired by the image processing device 4 (e.g., from a manufacturer of the RGB camera 2). For example, in an embodiment where the RGB camera 2 uses fisheye lens, the image fusion module 41 adjusts the RGB image by utilizing a fisheye calibration matrix that is predetermined with respect to the RGB camera 2 to eliminate fisheye distortion in the RGB image.

Returning to FIG. 4, in Step S3, the coordinate transformation module 42 of the image processing device 4 generates a two-dimensional coordinate chart based on the coordinates of the radar points that are contained in the radar information received from the mmWave radar 3, generates a second fused image based on the first fused image and the coordinate chart, and sends the second fused image thus generated to the image integration module 44 (this data flow is indicated in FIG. 3 by the arrow between the transformation module 42 and the image integration module 44).

Figure 6:
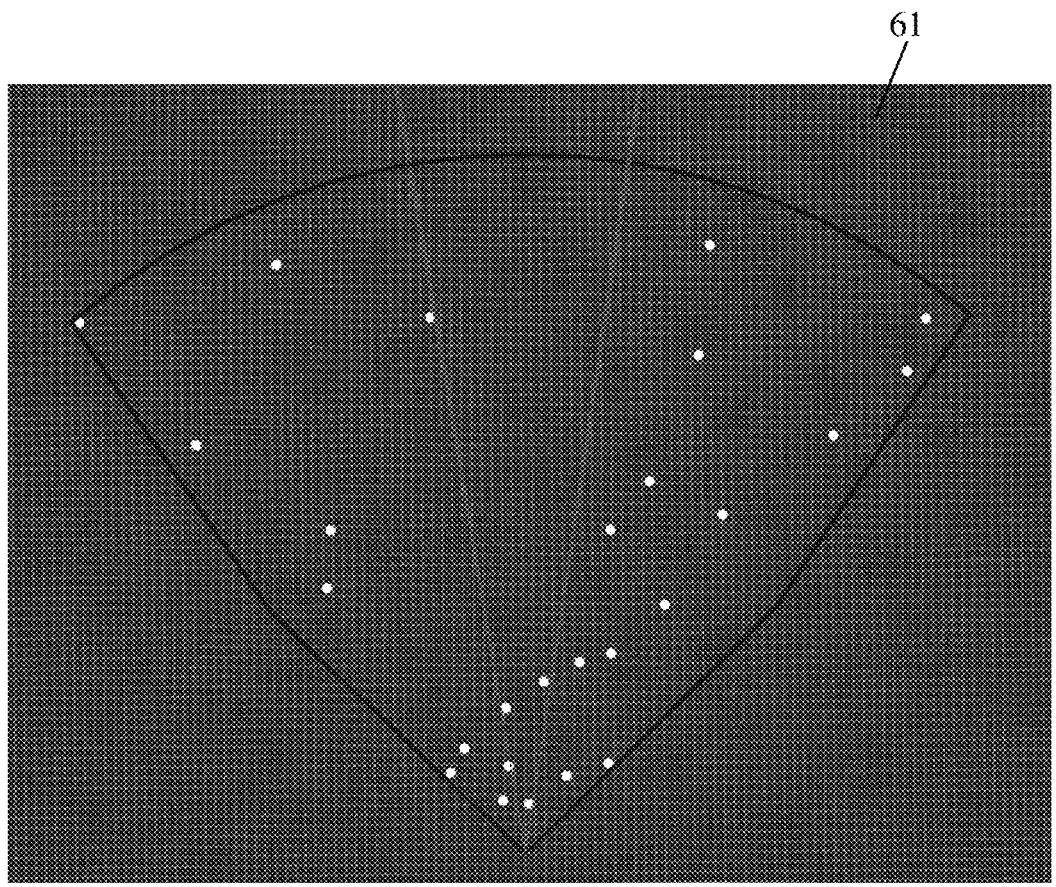
FIG. 6 exemplarily illustrates a coordinate chart according to an embodiment of the disclosure.

Specifically, the coordinate chart generated by the coordinate transformation module 42 includes a plurality of data points each of which corresponds to one or more of the plurality of radar points, and each of which indicates a location in the scene that is occupied by an object. According to some embodiments, the coordinate chart may be generated by utilizing a data visualization software tool, such as Robot Operating System (ROS) Visualization (also known as RViz), but the disclosure is not limited thereto. In some embodiments, any one of the data points of the coordinate chart may correspond to multiple radar points that have the same coordinates or have coordinates approximate to one another. A coordinate chart 61 thus generated by the coordinate transformation module 42 is exemplarily illustrated in FIG. 6, where multiple data points are shown by the white points. According to some embodiments, the coordinate transformation module 42 may also send the coordinates of the radar points and information about corresponding relationship between the radar points and the data points to the image integration module 44 along with the second fused image.

Figure 7:
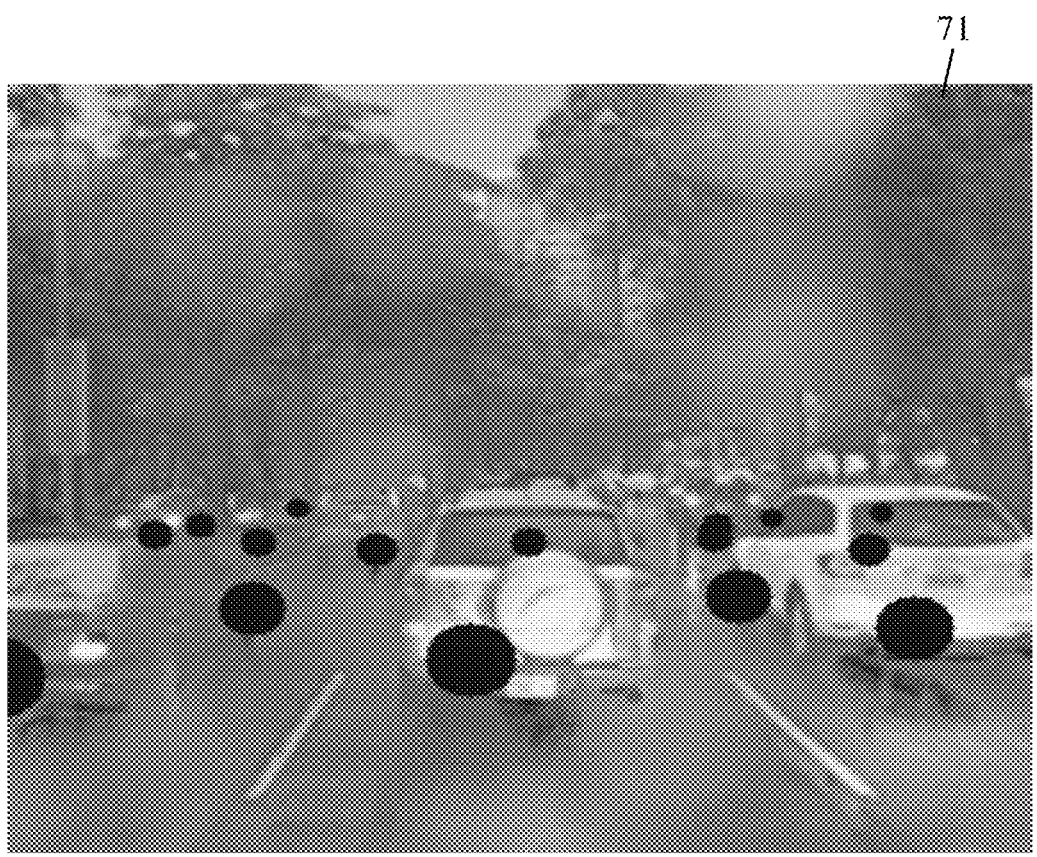
FIG. 7 exemplarily illustrates a second fused image according to an embodiment of the disclosure.

The coordinate transformation module 42 generates the second fused image by projecting the data points of the coordinate chart onto the first fused image according to a radar-to-camera projection matrix that is derived with respect to the mmWave radar 3 and the RGB camera 2, so that the second fused image includes multiple graphical points corresponding to the data points. It is noted that only a portion of the data points of the coordinate chart that corresponds to the radar points related to spatial points in the scene which is shown in the first fused image (that is, the spatial points that fall within the field of view of the RGB camera 2, within the field of view of the thermal camera 1 and also within the scanning field of the mmWave radar 3) is projected onto the first fused image, and the second fused image includes the multiple graphical points that correspond respectively to the data points in the portion (of the data points). A second fused image 71 is exemplarily illustrated in FIG. 7, where multiple graphical points are shown as roundish spots (including the half roundish spot at the left-hand side). In the second fused image 71 shown in FIG. 7, the graphical points each have a size that is negatively correlated to a distance from the mmWave radar 3 to the spatial point corresponding to the related data point, but the disclosure is not limited thereto.

Figure 8:
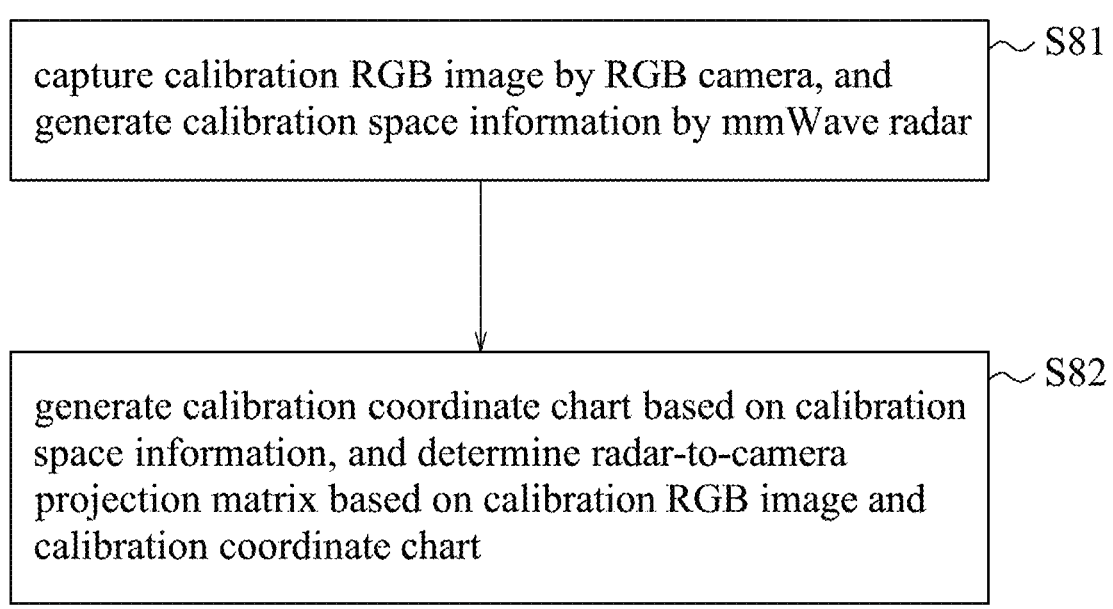
FIG. 8 is a flow chart that exemplarily illustrates a procedure for deriving a radar-to-camera projection matrix according to an embodiment of the disclosure.

According to some embodiments, the radar-to-camera projection matrix that the coordinate transformation module 42 uses in projecting the data points onto the first fused image may be derived through a procedure as illustrated in FIG. 8. This procedure may be included in the method for detecting and analyzing objects before all of the steps shown in FIG. 4.

Referring to FIG. 8, the procedure for deriving the radar-to-camera projection matrix includes Step S81 and Step S81.

In Step S81, the RGB camera 2 captures an RGB image of a calibration plate for the purpose of calibration (referred to as "calibration RGB image" hereinafter) (that is, the calibration RGB image captured by the RGB camera 2 would include an image of the calibration plate), and the mmWave radar 3 scans a place where the calibration plate is located in order to generate radar information for the purpose of calibration (referred to as "calibration radar information" hereinafter). The calibration radar information includes coordinates of multiple radar points related to the calibration plate. In an embodiment, the calibration plate is a white board, but the disclosure is not limited thereto.

In Step S82, a computer device (which may be, for example, the image processing device 4) utilizes the data visualization software tool (which may be, e.g., RViz) to generate a coordinate chart (referred to as "calibration coordinate chart" hereinafter) based on the coordinates of the multiple radar points related to the calibration plate, and determines the radar-to-camera projection matrix based on the calibration RGB image and the calibration coordinate chart. The calibration coordinate chart includes multiple data points corresponding to the multiple radar points that are related to the calibration plate. In some embodiments, the calibration coordinate chart includes only or almost only the data points corresponding to the radar points that are related to the calibration plate.

The radar-to-camera projection matrix is determined (or, calculated) by utilizing perspective transformation and based on the calibration RGB image, which includes the image of the calibration plate, and on the calibration coordinate chart, which includes the multiple data points corresponding to the multiple radar points that are related to the calibration plate. The radar-to-camera projection matrix is a homography matrix that is for projecting the multiple data points onto the image of the calibration plate.

According to some embodiments, Step S82 may further include adjusting the calibration RGB image. In this case, the radar-to-camera projection matrix is determined based on the calibration coordinate chart and the calibration RGB image that has been adjusted. Specifically, in embodiments where the RGB camera 2 does not use a wide-angle lens (e.g., the RGB camera 2 uses a general purpose lens or a standard lens), the image fusion module 41 may adjust the calibration RGB image by utilizing the matrix of intrinsic parameters (mentioned above with respect to Step S2 shown in FIG. 2) for the RGB camera 2. In embodiments where the RGB camera 2 uses a wide-angle lens (e.g., a fisheye lens), the image fusion module 41 may adjust the calibration RGB image by utilizing the calibration matrix (also mentioned above with respect to Step S2) for the RGB camera 2.

Returning to FIG. 4, in Step S4, the object detection module 43 of the image processing device 4 detects objects in the scene that are present in the RGB image (which may have been adjusted in Step S2) and the adjusted thermal image by analyzing the RGB image and the adjusted thermal image. In some embodiments, the image processing device 4 detects objects by classifying the objects into different categories. Then, the object detection module 43 locates the objects thus detected in the first fused image, generates a third fused image based on the first fused image by drawing, for each of the objects in the first fused image, a bounding box around the object to mark the object, and sends the third fused image thus generated to the image integration module 44 (this data flow is indicated in FIG. 3 by the arrow between the object detection module 43 and the image integration module 44). The object detection module 43 may detect the objects in the RGB image and the adjusted thermal image, and locate the objects thus detected in the first fused image by using any suitable existing object detection technique (as a non-limiting example, the technique of object detection using deep neural networks as disclosed in U.S. Pat. No. 9,275,308 B2).

Figure 9:
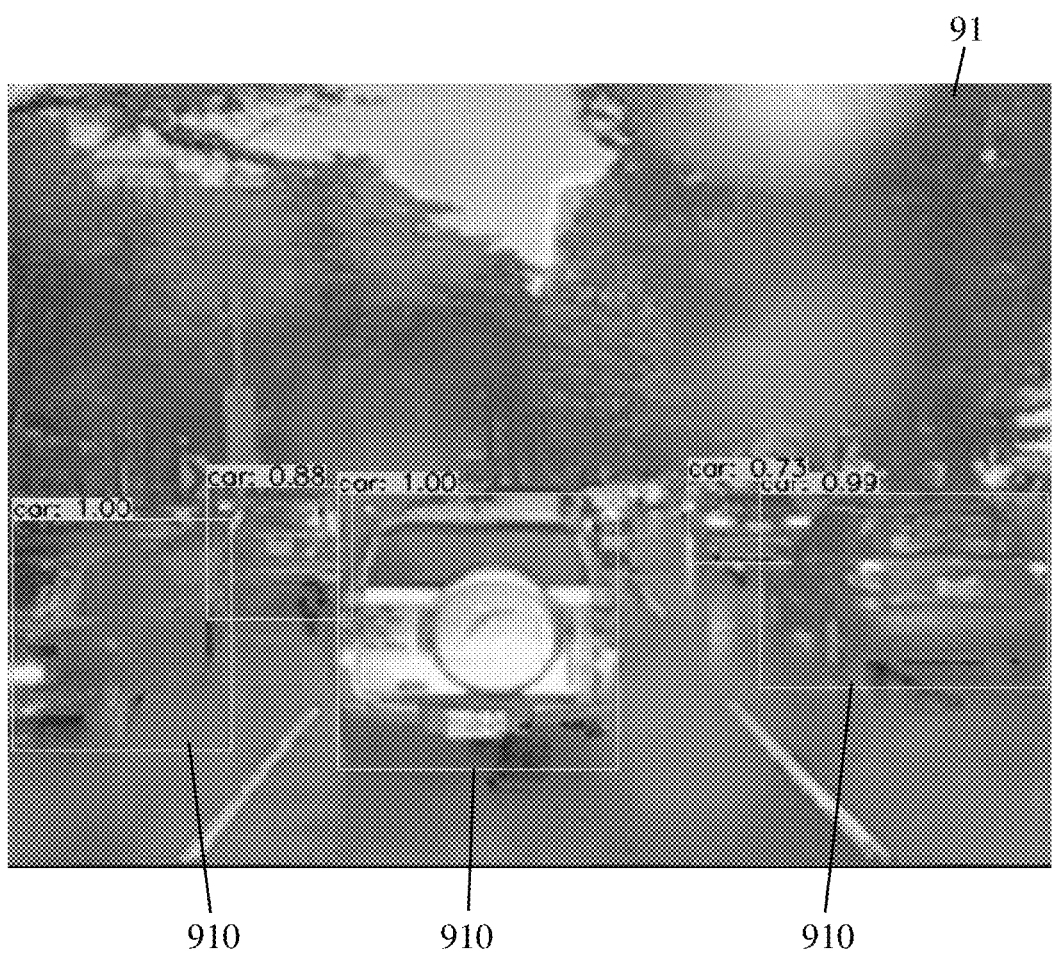
FIG. 9 exemplarily illustrates a third fused image according to an embodiment of the disclosure.

The third fused image includes, for each of the objects, a bounding box that marks the object. In some embodiments, the third fused image may further include, for each of the objects, a label that indicates an estimated category into which the object is classified. According to some embodiments, examples of the estimated category include "pedestrian", "vehicle", "car", "truck", "scooter", "bus", etc., and the bounding box may be presented in the third fused image by different colors corresponding to different estimated categories (e.g., green for "car", red for "pedestrian", etc.). The label may further indicate a reliability index which indicates a possibility of the object actually belonging to the estimated category, and which may be generated together with the detected result by performing the object detection technique. A third fused image 91 that includes not only the bounding boxes but also labels is exemplarily illustrated in FIG. 9. In the third fused image 91 shown in FIG. 9, five objects are each marked with a bounding box 910 and a label. The label indicates the category (which is "car") of the object and a reliability index that has a positive value at most equal to one (representing a one-hundred-percent possibility). It should be noted that it is not necessary for Step S4 to be performed after Step S3. Step S4 may be performed before or simultaneously with Step S3 instead.

In Step S5, the image integration module 44 of the image processing device 4 determines, with respect to each of the objects in the scene that is marked in the third fused image, a set of motion parameters of the object. The set of motion parameters of the object includes a distance of the object from the mmWave radar 3. According to some embodiments, the image integration module 44 may determine the distance of each of the objects from the mmWave radar 3 by three sub-steps. The first sub-step is to compare the second fused image and the third fused image to find at least one graphical point among the graphical points in the second fused image that is within a region defined by the bounding box of the third fused image that marks the object. According to some embodiments, the graphical point(s) in a region defined by a bounding box may be determined by determining four pixel positions of the four corner points of the bounding box in the third fused image, defining a corresponding region in the second fused image by using the four pixel positions, and finding graphical point(s) located in the corresponding region. The second sub-step is to find out multiple radar points that correspond to the at least one graphical point found in the first sub-step (i.e., to find all those radar points included in the radar information generated by the mmWave radar 3 that correspond to at least one data point, which is in the coordinate chart generated by the coordinate transformation module 42 and which corresponds to the at least one graphical point), and determine which one of said multiple radar points is a nearest radar point to the mmWave radar 3 based on the coordinates of the radar points. The third sub-step is to calculate the distance from the mmWave radar 3 to the object based on the coordinates of the nearest radar point, to serve as the distance of the object from the mmWave radar 3.

According to some embodiments, the set of motion parameters of the object may also include a location, a speed and an orientation of the object that are determined based on the coordinates of the radar points. Determination of the orientation may involve predicting future coordinates by using Kalman filtering and the coordinates of radar points that are obtained at multiple time points, and comparing the future coordinates with the coordinates of radar points at a current time. Utilizing information gathered by an mmWave radar (e.g., the mmWave radar 3) to derive location (which may be a set of spatial coordinates), speed and orientation of an object is common knowledge in the art, so details of how the image integration module 44 determines the locations, the speeds and the orientations are not described here.

Figure 10:
FIG. 10 exemplarily illustrates a result image according to an embodiment of the disclosure.

According to some embodiments, in Step S5, the image integration module 44 may further generate a result image based on the third fused image. The result image includes, with respect to each of the objects, a bounding box marking the object and a label near the bounding box that indicates the distance from the mmWave radar 3 to the object. In some embodiments, the image integration module 44 generates the result image by modifying each label in the third fused image to further indicate the distance of the corresponding object. In some embodiments, the labels in the result image may each further include information indicating at least one of the location, the speed, the orientation and/or the reliability index of the corresponding object. A result image 101 is exemplarily illustrated in FIG. 10. The result image 101 is derived from the third fused image 91 of FIG. 9, and includes labels that each indicate the category, the distance and the speed of the corresponding object. In Step S6, the image processing device 4 generates object information that indicates, for each of the objects marked in the third fused image, the category of the object and the set of motion parameters of the object, and outputs the object information. According to some embodiments, the object information may further indicate, for each of the objects marked in the third fused image, the reliability index of the object. In embodiments where the result image has been generated in Step S5, the image processing device 4 may readily use the result image to serve as the object information to be outputted, and does not have to generate the object information in Step S6. According to some embodiments, the image processing device 4 may output the object information to, for example, an automotive computer of a car on which the system is installed, so that the automotive computer may issue safety warning to a driver of the car or control the car to take specific safety actions (e.g., braking or accelerating) based on the object information. In some embodiments where the object information is the result image generated in Step S5, the image processing device 4 may output the result image to a display device for view by a user controlling or supervising the carrier device on which the system is installed. For example, in an embodiment where the system is installed on a car, the result image may be outputted to and displayed on a monitor in the car for the driver to see, so that the driver may have a better perception of the actual traffic condition, thereby increasing driving safety.

In summary, the method and the system for detecting and analyzing objects as provided above take advantage of beneficial points of each of the thermal camera 1, the RGB camera 2 and the mmWave radar 3 to supplement a characteristic of the RGB camera 2 that is related to reliance on light, and a characteristic of the thermal camera 1 that does not focus on capturing visible details, so that the object information (which may be the result image) obtained thereby faithfully reflects the scene in front of the system and is always clear under any weather or light condition. In addition, the distance information between the system and each identified object in the scene (and other information such as the location, the speed and the orientation of each identified object) that is provided in the object information is also useful in improving driving safety.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for detecting and analyzing objects that is to be performed by a system including a thermal camera, an RGB camera, a millimeter wave (mmWave) radar and an image processing device, the image processing device including an image fusion module, a coordinate transformation module, an object detection module and an image integration module, the method comprising steps of:
    A) controlling the thermal camera, the RGB camera and the mmWave radar to operate synchronously, so that the thermal camera captures a thermal image of a scene at a time point and sends the thermal image to the image processing device, the RGB camera captures an RGB image of the scene at the same time point and sends the RGB image to the image processing device, and the mmWave radar generates radar information with respect to the scene at the same time point by scanning the scene and sends the radar information to the image processing device, wherein the radar information includes coordinates of a plurality of radar points related to multiple objects in the scene that have been detected by the mmWave radar;
    B) by the image fusion module of the image processing device, adjusting the thermal image based on the RGB image in order to generate an adjusted thermal image, and generating a first fused image by combining the RGB image and the adjusted thermal image;
    C) by the coordinate transformation module of the image processing device, generating a coordinate chart that includes a plurality of data points based on the coordinates of the radar points, wherein each of the data points corresponds to at least one of the radar points, and generating a second fused image based on the first fused image by projecting the data points of the coordinate chart onto the first fused image according to a radar-to-camera projection matrix, the second fused image including graphical points corresponding respectively to the data points;
    D) by the object detection module of the image processing device, detecting objects in the scene that are present in the RGB image and the adjusted thermal image by analyzing the RGB image and the adjusted thermal image, locating the objects thus detected in the first fused image, and generating a third fused image based on the first fused image by drawing, for each of the objects in the first fused image, a bounding box around the object to mark the object; and
    E) by the image integration module of the image processing device and for each of the objects in the scene that is marked in the third fused image, determining a set of motion parameters of the object that includes a distance from the mmWave radar to the object, wherein the distance is determined by:
        comparing the second fused image and the third fused image to find at least one graphical point among the graphical points in the second fused image that is within a region defined by the bounding box that marks the object,
        determining which one of the radar points that correspond to at least one data point corresponding to the at least one graphical point thus found is a nearest radar point to the mmWave radar based on coordinates of the radar points, and
        calculating the distance from the mmWave radar to the object based on the coordinates of the nearest radar point.

2. The method of claim 1, wherein:
    step D) is to, with respect to each of the objects in the scene that is present in the RGB image and the adjusted thermal image, detect the object by classifying the object into a category; and
    the method further comprises a step of:
        F) by the image processing device, generating object information that indicates, for each of the objects in the scene that is marked in the third fused image, the category of the object and the set of motion parameters of the object.

3. The method of claim 2, wherein:
step E) includes determining, for each of the objects in the scene that is marked in the third fused image, the set of motion parameters that further includes a location of the object and a speed of the object, wherein the location and the speed are determined based on the coordinates of the radar points.

4. The method of claim 1, wherein step E) further includes:
generating a result image based on the third fused image, wherein the result image includes, with respect to each of the objects in the scene that is marked in the third fused image, a bounding box that marks the object and a label near the bounding box that indicates the distance from the mmWave radar to the object.

5. The method of claim 1, wherein:
the RGB camera uses a lens that is not a wide-angle lens; and
step B) includes adjusting the RGB image by utilizing a matrix of intrinsic parameters for the RGB camera, and generating the first fused image by combining the RGB image thus adjusted and the adjusted thermal image.

6. The method of claim 1, wherein:
the RGB camera uses a wide-angle lens; and
step B) includes adjusting the RGB image by utilizing a calibration matrix for the RGB camera that reduces distortion effect in the RGB image, and generating the first fused image by combining the RGB image thus adjusted with the adjusted thermal image.

7. The method of claim 1, further comprising steps of:
G) controlling the RGB camera to capture an RGB image that includes an image of a calibration plate and that serves as a calibration image, and controlling the mmWave radar to scan a place at which the calibration plate is located in order to generate calibration radar information, the calibration radar information including coordinates of multiple radar points related to the calibration plate; and
H) generating another coordinate chart that includes multiple data points corresponding respectively to the multiple radar points related to the calibration plate based on the coordinates of the multiple radar points, and determining the radar-to-camera projection matrix by utilizing perspective transformation and based on the calibration image and on the another coordinate chart, the radar-to-camera projection matrix being a homography matrix that is for use in projecting the multiple data points onto the image of the calibration plate.

8. The method of claim 7, wherein:
the RGB camera uses a lens that is not a wide-angle lens; and
step H) includes adjusting the calibration image based on a matrix of intrinsic parameters for the RGB camera; and
step H) is to determine the radar-to-camera projection matrix based on the another coordinate chart and the calibration image that has been adjusted and that includes the image of the calibration plate which has been adjusted, the radar-to-camera projection matrix being for use in projecting the multiple data points in the another coordinate chart onto the image of the calibration plate that has been adjusted.

9. The method of claim 7, wherein:
the RGB camera uses a wide-angle lens; and
step H) includes adjusting the calibration image by utilizing a calibration matrix for the RGB camera that reduces distortion effect in the calibration images; and
step H) is to determine the radar-to-camera projection matrix based on the another coordinate chart and the calibration image that has been adjusted and that includes the image of the calibration plate which has been adjusted, the radar-to-camera projection matrix being for use in projecting the multiple data points in the another coordinate chart onto the image of the calibration plate that has been adjusted.

10. A system for detecting and analyzing objects, the system comprising:
an image processing device including an image fusion module, a coordinate transformation module, an object detection module and an image integration module;
a thermal camera that is in communication with said image processing device and that is configured to capture thermal images and send the thermal images to said image processing device;
an RGB camera that is in communication with said image processing device, and that is configured to capture RGB images and send the RGB images to said image processing device; and
a millimeter wave (mmWave) radar that is in communication with said image processing device, and that is configured to scan a space in order to detect object(s) in the space, generate radar information related to the space, and send the radar information to said image processing device;
wherein said image processing device is configured to control said thermal camera, said RGB camera and said mmWave radar to operate synchronously, so that said thermal camera captures a thermal image of a scene at a time point and sends the thermal image to said image processing device, said RGB camera captures an RGB image of the scene at the same time point and sends the RGB image to said image processing device, and said mmWave radar generates radar information with respect to the scene at the same time point by scanning the scene and sends the radar information to said image processing device, wherein the radar information includes coordinates of a plurality of radar points related to multiple objects in the scene that have been detected by said mmWave radar;
wherein said image fusion module of said image processing device is configured to:
adjust the thermal image based on the RGB image in order to generate an adjusted thermal image, and
generate a first fused image by combining the RGB image and the adjusted thermal image;
wherein said coordinate transformation module of said image processing device is configured to:
generate a coordinate chart that includes a plurality of data points based on the coordinates of the radar points, wherein each of the data points corresponds to at least one of the radar points, and
generate a second fused image based on the first fused image by projecting the data points of the coordinate chart onto the first fused image according to a radar-to-camera projection matrix, wherein the second fused image includes graphical points corresponding respectively to the data points;
wherein said object detection module of said image processing device is configured to:

detect objects in the scene that are present in the RGB image and the adjusted thermal image by analyzing the RGB image and the adjusted thermal image, locate the objects thus detected in the first fused image, and generate a third fused image based on the first fused image by drawing, for each of the objects in the first fused image, a bounding box around the object to mark the object; and wherein said image integration module of said image processing device is configured to, for each of the objects in the scene that is marked in the third fused image, determine a set of motion parameters that includes a distance from said mmWave radar to the object, wherein the distance is determined by:

comparing the second fused image and the third fused image to find at least one graphical point among the graphical points in the second fused image that is within a region defined by the bounding box that marks the object;

determining which one of the radar points that correspond to at least one data point corresponding to the at least one graphical point thus found is a nearest radar point to said mmWave radar based on coordinates of the radar points; and calculating the distance from said mmWave radar to the object based on the coordinates of the nearest radar point.

11. The system of claim 10, wherein:

said object detection module of said image processing device is configured to, with respect to each of the objects in the scene that is present in the RGB image and the adjusted thermal image, detect the object by classifying the object into a category; and said image processing device is configured to generate object information that indicates, for each of the objects in the scene that is marked in the third fused image, the category of the object and the set of motion parameters of the object.

12. The system of claim 11, wherein said image integration module of said image processing device is configured to determine, for each of the objects in the scene that is marked in the third fused image, the set of motion parameters of the object that further includes a location of the object and a speed of the object that are determined based on the coordinates of the radar points.

13. The system of claim 10, wherein said image integration module of said image processing device is further configured to generate a result image based on the third fused image, the result image including, with respect to each of the objects in the scene that is marked in the third fused image, a bounding box that marks the object and a label near the bounding box that indicates the distance from the mmWave radar to the object.

14. The system of claim 10, wherein said image processing device is further configured to:

control said RGB camera to capture an RGB image that includes an image of a calibration plate and that serves as a calibration image;

control said mmWave radar to scan a place where the calibration plate is located in order to generate calibration radar information, wherein the calibration radar information includes coordinates of multiple radar points related to the calibration plate;

generate another coordinate chart that includes multiple data points corresponding respectively to the multiple radar points related to the calibration plate based on the coordinates of the multiple radar points; and determine the radar-to-camera projection matrix by utilizing perspective transformation and based on the calibration image and on the another coordinate chart, wherein the radar-to-camera projection matrix is a homography matrix that is for use in projecting the multiple data points onto the image of the calibration plate.

15. The system of claim 14, wherein:

said RGB camera uses a lens that is not a wide-angle lens; and said image integration module of said image processing device is configured to:

adjust the RGB image of the scene and the calibration image by utilizing a matrix of intrinsic parameters for said RGB camera;

generate the first fused image by combining the RGB image thus adjusted and the adjusted thermal image; and determine the radar-to-camera projection matrix based on the another coordinate chart and the calibration image that has been adjusted and that includes the image of the calibration plate which has been adjusted, the radar-to-camera projection matrix being for use in projecting the multiple data points in the another coordinate chart onto the image of the calibration plate that has been adjusted.

16. The system of claim 14, wherein:

said RGB camera includes a wide-angle lens; and said image integration module of said image processing device is configured to:

adjust the RGB image of the scene and the calibration image by utilizing a calibration matrix for said RGB camera that reduces distortion effect in said RGB image and the calibration image;

generate the first fused image by combining the RGB image thus adjusted and the adjusted thermal image; and determine the radar-to-camera projection matrix based on the another coordinate chart and the calibration image that has been adjusted and that includes the image of the calibration plate which has been adjusted, the radar-to-camera projection matrix being for use in projecting the multiple data points in the another coordinate chart onto the image of the calibration plate that has been adjusted.

* * * * *